United States Patent
Jeon et al.

(10) Patent No.: US 9,356,450 B2
(45) Date of Patent: May 31, 2016

(54) POWER SUPPLY CIRCUITS WITH DISCHARGE CAPABILITY AND METHODS OF OPERATING SAME

(71) Applicant: Samsung Electronics Co., Ltd., Suwon-si (KR)

(72) Inventors: Sang Hun Jeon, Suwon-si (KR); Iksung Park, Seoul (KR); Young-Sang Cho, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 527 days.

(21) Appl. No.: 13/766,242

(22) Filed: Feb. 13, 2013

(65) Prior Publication Data

US 2013/0207695 A1 Aug. 15, 2013

(30) Foreign Application Priority Data

Feb. 14, 2012 (KR) .................. 10-2012-0014886

(51) Int. Cl.
*H02J 7/00* (2006.01)
*H02J 9/06* (2006.01)

(52) U.S. Cl.
CPC .. *H02J 7/00* (2013.01); *H02J 9/061* (2013.01)

(58) Field of Classification Search
CPC .................................. H02J 7/00; H02J 9/061
See application file for complete search history.

(56) References Cited

U.S. PATENT DOCUMENTS

| | | | | | |
|---|---|---|---|---|---|
| 3,753,001 | A | * | 8/1973 | Hiroshima et al. | 307/10.1 |
| 5,051,995 | A | * | 9/1991 | Tobita | 714/718 |
| 5,572,735 | A | * | 11/1996 | Tanikawa | 713/300 |
| 5,963,409 | A | * | 10/1999 | Chang | 361/56 |
| 7,203,104 | B2 | * | 4/2007 | Hijikata | 365/189.07 |
| 7,266,709 | B2 | | 9/2007 | Chapuis et al. | |
| 7,554,305 | B2 | * | 6/2009 | Nunokawa et al. | 323/273 |
| 7,863,878 | B2 | * | 1/2011 | Park et al. | 323/282 |
| 7,964,992 | B2 | * | 6/2011 | Apfel | 307/82 |
| 8,593,113 | B2 | * | 11/2013 | Baker et al. | 320/166 |
| 8,648,578 | B2 | * | 2/2014 | Zhao et al. | 323/226 |
| 2010/0181831 | A1 | | 7/2010 | Miyazaki | |
| 2011/0012888 | A1 | | 1/2011 | Ko et al. | |

FOREIGN PATENT DOCUMENTS

| | | | | |
|---|---|---|---|---|
| JP | 2000-152497 | A | 5/2000 | |
| JP | 2005-269812 | A | 9/2005 | |
| JP | 2005-276034 | A | 10/2005 | |
| JP | 2006-204013 | A | 8/2006 | |
| JP | 2007-014152 | A | 1/2007 | |
| JP | 2009-060690 | A | 3/2009 | |
| JP | 2009-194961 | A | 8/2009 | |
| JP | 2009194961 | A | * 8/2009 | ............... H02J 1/00 |
| KR | 10-2005-0110783 | A | 11/2005 | |
| KR | 10-0606896 | B1 | 2/2006 | |

(Continued)

*Primary Examiner* — Thienvu Tran
*Assistant Examiner* — Pinping Sun
(74) *Attorney, Agent, or Firm* — Myers Bigel & Sibley, P.A.

(57) ABSTRACT

A power supply circuit includes a sequence control circuit configured to generate at least one control signal in response to a main power source, a voltage regulator circuit configured to be coupled to the main power source and to selectively generate at least one power supply voltage for a chipset from the main power source in response to the at least one control signal and a discharge circuit configured to discharge the voltage regulator circuit responsive to the at least one control signal.

15 Claims, 7 Drawing Sheets

(56) References Cited

FOREIGN PATENT DOCUMENTS

| KR | 10-0601582 B1 | 7/2006 |
| KR | 100601582 B * | 7/2006 | ............... H04B 1/40 |
| KR | 10-2009-0049633 A | 5/2009 |
| KR | 10-2011-0006369 A | 1/2011 |

* cited by examiner

POWER SUPPLY CIRCUITS WITH DISCHARGE CAPABILITY AND METHODS OF OPERATING SAME

CROSS-REFERENCE TO RELATED APPLICATIONS

A claim for priority under 35 U.S.C. §119 is made to Korean Patent Application No. 10-2012-0014886 filed Feb. 14, 2012, in the Korean Intellectual Property Office, the entire contents of which are hereby incorporated by reference.

BACKGROUND

The inventive subject matter described herein relates to power supply circuits and methods and, more particularly, to sequenced power supply circuits and methods of operation thereof.

A semiconductor device may be supplied with power from an external device. For example, a semiconductor memory device may be supplied with power that enables the memory device to perform read and write operations.

As semiconductor device have become more highly integrated, the operating voltage used in such devices have gradually decreased. An external high voltage may be converted into a low supply voltage for reliable operation of a semiconductor device.

Internal blocks of a chipset may use different power supply voltages. Thus, a power supply circuit may convert an external voltage into at multiple different power supply voltages for the internal blocks. For example, a semiconductor memory device may be supplied with an external voltage and a ground voltage and may generate multiple voltages, such as a reference voltage, a core voltage, a peripheral voltage, and a bulk voltage. Techniques for supplying stable power may protect internal elements of the chipset from sudden power supply and interruption.

Upon power-up of an external voltage applied to a semiconductor device by a power supply circuit, charge may remain in a capacitor of the power supply circuit. Therefore, a voltage supplied to the chipset may not be lowered to a sufficiently low state, even when the power supply circuit is in an off state. This may cause abnormal operation of the semiconductor device.

SUMMARY

In some embodiments of the inventive subject matter, a power supply circuit includes a sequence control circuit configured to generate at least one control signal in response to a main power source, a voltage regulator circuit configured to be coupled to the main power source and to selectively generate at least one power supply voltage for a chipset from the main power source in response to the at least one control signal and a discharge circuit configured to discharge the voltage regulator circuit responsive to the at least one control signal. In some embodiments, the voltage regulator circuit may be configured to be enabled responsive to a first state of the at least one control signal and to be disabled responsive to a second state of the at least one control signal and the discharge circuit may be configured to discharge the voltage regulator circuit responsive to the second state of the at least one control signal.

In some embodiments, the discharge circuit may include a discharge control circuit configured to generate a discharge signal responsive to the control signal and an output discharge circuit configured to discharge at least one output of the voltage regulator circuit responsive to the discharge signal. The power supply circuit may further include an input discharge circuit configured to discharge at least one input of the voltage regulator circuit responsive to the discharge signal. In further embodiments, the power supply circuit may include a backup power source configured to store energy received from the main power source and to provide stored energy to the discharge circuit.

In some embodiments, the sequence control circuit may include a voltage detector circuit configured to generate a voltage detection signal responsive to the main power source and a delay circuit configured to receive the voltage detection single and to generate the control signal.

In some embodiments, the voltage detector circuit may include a plurality of voltage detectors configured to generate respective voltage detection signals when a voltage of the main power supply reaches various different levels and the delay circuit may include a plurality of delays, respective ones of which receive respective ones of the voltage detection signals and generate respective control signals responsive thereto. The delays may be configured to provide different delays for different logic transitions of the voltage detection signals.

In further embodiments, the voltage regulator circuit may include a plurality of voltage regulators, respective ones of which operate responsive to respective ones of the control signals. The discharge circuit may include a plurality of discharge circuits, respective ones of which are configured to discharge respective ones of the voltage regulators responsive to respective ones of the control signals.

Further embodiments of the inventive subject matter provide an apparatus including a voltage regulator circuit configured to be coupled to a power source and to generate respective power supply outputs responsive to respective control signals, a discharge circuit configured discharge respective ones of the power supply outputs responsive to respective ones of the control signals and a control circuit coupled to the voltage regulator circuit and configured to detect a voltage of the power source and to generate the control signals responsive to the detected voltage. The voltage regulator circuit may include a plurality of voltage regulators configured to be enabled and disabled responsive to respective ones of the control signals and the discharge circuit may be configured to discharge respective ones of the voltage regulators responsive to respective ones of the control signals.

The control circuit may be configured to enable respective ones of the voltage regulators at respective different voltage levels of the power source. The control circuit may also be configured to disable and discharge respective ones of the voltage regulators at respective different voltage levels of the power source. The power source may include a main power source and the apparatus may further include a backup power source configured to be charged from the main power source and to provide power to the discharge circuit.

Some embodiments provide methods of supplying power to a chipset. The methods include detecting a voltage level of a power source, selectively enabling voltage regulators coupled between the power source and power inputs of the chipset responsive to the detected voltage level of the power source, and selectively disabling and discharging the voltage regulators responsive to the detected voltage level of the power supply voltage. The voltage regulators may be configured to output respective different voltages, selectively enabling voltage regulators coupled between the power source and power inputs of the chipset responsive to the detected voltage level of the power source may include sequentially enabling the voltage regulators as the detected voltage level of the power source as the detected voltage level of the power source increases, and selectively disabling and discharging the voltage regulators responsive to the detected voltage level of the power supply voltage may include sequentially disabling and discharging the voltage regulators as the detected voltage level of the power supply voltage decreases. The methods may further include charging a backup power source from the power source and selectively disabling and discharging the voltage regulators responsive to the detected voltage level of the power supply voltage may include discharging the voltage regulators using a discharge circuit powered by the backup power source.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments will be described in detail with reference to the accompanying drawings. The inventive subject matter, however, may be embodied in various different forms, and should not be construed as being limited only to the illustrated embodiments. Rather, these embodiments are provided as examples so that this disclosure will be thorough and complete, and will fully convey the concept of the inventive subject matter to those skilled in the art. Accordingly, known processes, elements, and techniques are not described with respect to some of the embodiments of the inventive subject matter. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive subject matter.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive subject matter. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
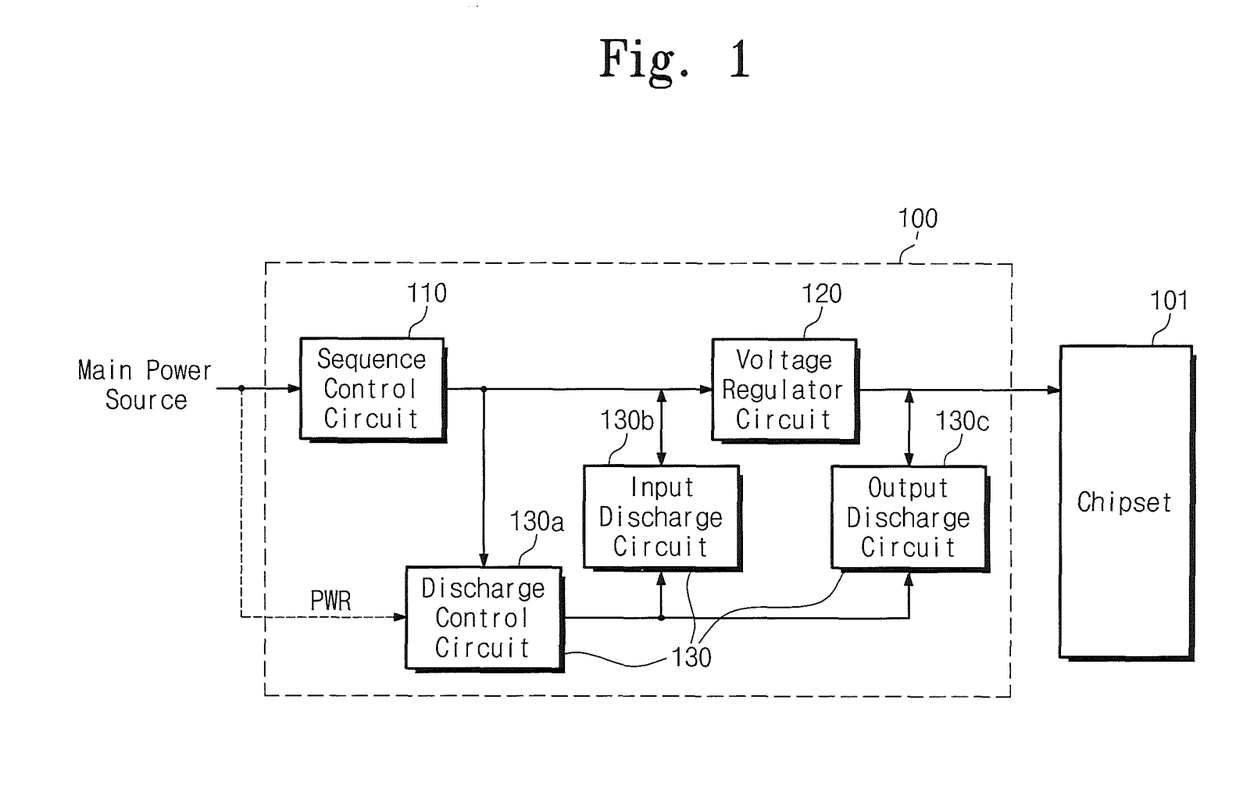
FIG. 1 is a block diagram schematically illustrating a power supply circuit according to some embodiments of the inventive subject matter.

FIG. 1 is a block diagram schematically illustrating a power supply circuit according to some embodiments of the inventive subject matter. Referring to FIG. 1, a power supply circuit 100 may include a sequence control circuit 110, a voltage regulator circuit 120, and a discharge circuit 130.

The power supply circuit 100 may be supplied with a main power source for the power supply circuit 100 and a chipset 101. The power supply circuit 100 may generate an operating power for the chipset 101 from the input main power source. The main power source supplied to the power supply circuit 100 may be provided from an external device.

Internal elements of the chipset 101 connected to the power supply circuit 100 may need different power supply voltages.

The power supply circuit 100 may produce a plurality of supply voltages to be provided to the chipset 101.

The sequence control circuit 110 may control the voltage regulator circuit 120 using a control signal. The sequence control circuit 110 may control an applying sequence of supply voltages to be provided to the chipset 101. The sequence control circuit 110 may powered from the main power source.

The sequence control circuit 110 may detect a voltage level of the main power source. The sequence control circuit 110 may generate a detection signal when the main power source voltage reaches a predetermined detection level. The sequence control circuit 110 may delay the detection signal to then output it as a control signal.

The sequence control circuit 110 can be configured to generate detection signals corresponding to detection levels. Delay times of the detection signals may differ from one another. The sequence control circuit 110 may output control signals delayed different delay times according to a voltage level of the main power source.

The voltage regulator circuit 120 may convert the main power source into a supply voltage. The voltage regulator circuit 120 may include at least one voltage regulator which has power and enable signal inputs. Each voltage regulator may produce an output voltage at a predetermined voltage level from the main power source input in response to an enable signal. Voltage levels of output voltages of the voltage regulators may be different.

The discharge circuit 130 may discharge a capacitor of the power supply circuit 100 before the chipset 101 is powered. Upon interruption of the main power source, the discharge circuit 130 may discharge remaining charge at the power supply circuit 100. The discharge circuit 130 may include a discharge control circuit 130*a*, an input discharge circuit 130*b*, and an output discharge circuit 130*c*.

The discharge control circuit 130*a* may control the input discharge circuit 130*b* and the output discharge circuit 130*c* in response to a control signal from the sequence control circuit 110. For example, when the control signal from the sequence control circuit 110 is at a low level, the discharge control circuit 130*a* may generate a discharge signal such that remaining charge are discharged by the input discharge circuit 130*b* and the output discharge circuit 130*c*.

When the control signal from the sequence control circuit 110 is at a low level, the voltage regulator circuit 120 may be in an inactive state. Conversely, when the control signal from the sequence control circuit 110 is at a high level, the voltage regulator circuit 120 may go to a state wherein a supply voltage is output. The discharge control circuit 130*a* may discharge remaining charge during an inactive state of the voltage regulator circuit 120. When the voltage regulator circuit 120 is in an active state, the discharge control circuit 130*a* may generate a discharge signal such that discharging on remaining charge is stopped.

The input discharge circuit 130*b* may discharge charge remaining at an input stage of the voltage regulator circuit 120. The input discharge circuit 130*b* may be formed of a resistor and a semiconductor switch. A discharge operation of the input discharge circuit 130*b* may be controlled by a discharge signal from the discharge control circuit 130*a*.

The output discharge circuit 130*c* may discharge charge remaining at an output stage of the voltage regulator circuit 120. The output discharge circuit 130*c* may include, for example, a resistor and a semiconductor switch. A discharge operation of the output discharge circuit 130*c* may be controlled by the discharge signal from the discharge control circuit 130*a*.

The amount of discharge current discharged by the discharge circuit 130 may be variable. The discharge circuit 130 may control discharge speed and time. A discharge current amount on each block of the discharge circuit 130 may be variable. A "block" may be each discharge circuit of the discharge circuit 130, and blocks may be divided on the basis of an operating voltage supplied to the chipset 101. For example, under the control of the discharge circuit 130, a discharge current amount of a block using a high supply voltage is more than that of a block using a low supply voltage. According to the control of the discharge circuit 130, each block may perform a discharge operation according to a predetermined order.

The power supply circuit 100 may supply an operating voltage in a predetermined order under control of the sequence control circuit 110. When power is supplied to the chipset 101 and subsequently interrupted, the power supply circuit 100 may forcibly discharge charge remaining at the power supply circuit 100. The power supply circuit 100 may control an order that a supply voltage is supplied and interrupted, so that damage to internal elements of the chipset due to sudden current supply and interruption and resulting abnormal operations may be reduced.

Figure 2:
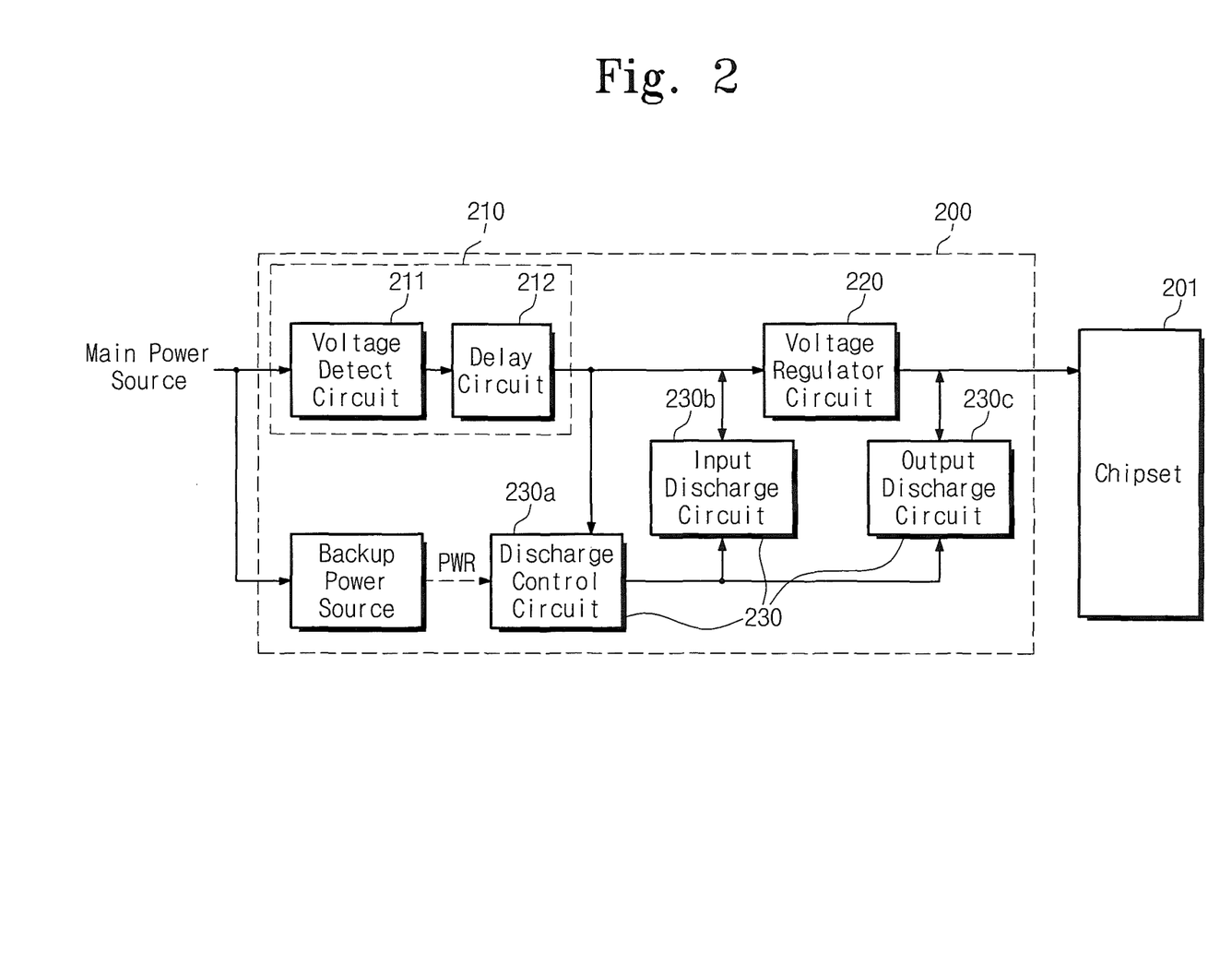
FIG. 2 is a block diagram schematically illustrating a power supply circuit according to further embodiments of the inventive subject matter.

FIG. 2 is a block diagram schematically illustrating a power supply circuit according to further embodiments of the inventive subject matter. Referring to FIG. 2, a power supply circuit 200 may include a sequence control circuit 210, a voltage regulator circuit 220, a discharge circuit 230, and a backup power source 240. The voltage regulator circuit 220 and the discharge circuit 230 in FIG. 2 may be similar to those shown in FIG. 1, and repeat description thereof is omitted.

The sequence control circuit 210 may include a voltage detector circuit 211 and a delay circuit 212. The voltage detector circuit 211 may detect a voltage level of a main power source. The voltage detector circuit 211 may include at least one voltage detector. The voltage detector may output a detection signal (e.g., a logic "high" signal) when the main power source reaches a predetermined voltage detection level. Voltage detectors in the voltage detector circuit 211 can be set to detect different voltage levels.

The delay circuit 212 may be connected to the voltage detector circuit 211. The delay circuit 212 may delay an output of the voltage detector circuit 211 a predetermined delay time. The delay circuit 212 may include one or more delays. Respective delays of the delay circuit 212 may be connected to respective voltage detectors of the voltage detector circuit 211 to delay outputs of the voltage detectors. Delays of the delay circuit 212 can provide different delay times.

The backup power source 240 may store a power provided from the main power source. When the main power source is interrupted, the backup power source 240 may power the discharge circuit 230 using the stored power. This may enable the discharge circuit 230 to operate during a discharge time of the backup power source 240 when the main power source is interrupted.

Using the power supply circuit 200, upon interruption of the main power source, the discharge circuit 230 may operate stably. This may enable charge remaining at the power supply circuit 200 to be discharged upon power interruption. The power supply circuit 200 may stabilize supply and interruption orders of the supply voltage. Accordingly, the power supply circuit 200 may limit damage to internal elements of a chipset due to current supply and interruption.

Figure 3:
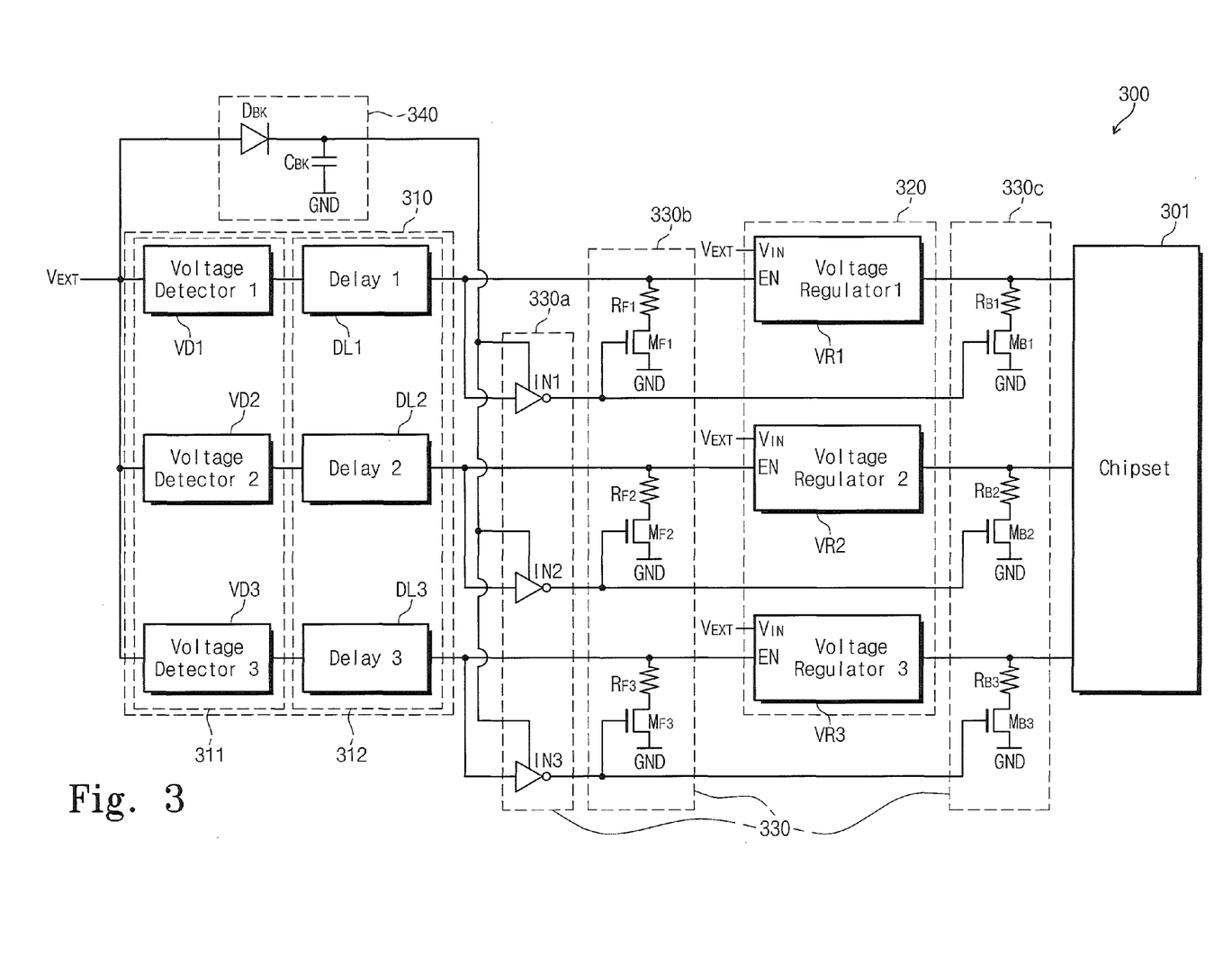
FIG. 3 is a block diagram schematically illustrating a power supply circuit according to still further embodiments of the inventive subject matter.

FIG. 3 is a block diagram schematically illustrating a power supply circuit according to still further embodiments of the inventive subject matter. Referring to FIG. 3, a power supply circuit 300 may include a sequence control circuit 310, a voltage regulator circuit 320, a discharge circuit 330, and a backup power source 340.

The sequence control circuit 310 may include a voltage detector circuit 311 and a delay circuit 312. The voltage detector circuit 311 may include a first voltage detector VD1, a second voltage detector VD2, and a third voltage detector VD3. The delay circuit 312 may include a first delay DL1, a second delay DL2, and a third delay DL3. The number of voltage detectors and the number of delays are not limited thereto. For example, some embodiments of the inventive subject matter may be applied to a power supply circuit having two or more voltage detectors and two or more delays.

The voltage detectors VD1 to VD3 may output detection signals when a main power source voltage $V_{EXT}$ reaches a predetermined voltage detection level. In example embodiments, detection signals from the voltage detectors VD1 to VD3 may be a logic "high" signal. It is assumed that voltage detection levels V1, V2, and V3 of the first to third voltage detectors VD1 to VD3 have a relationship such as V1<V2<V3.

When the main power source is supplied to the power supply circuit 300, its voltage level $V_{EXT}$ may reach the voltage detection levels V1, V2, and V3 sequentially. Thus, the first to third voltage detectors VD1 to VD3 may sequentially output logic "high" signals, respectively.

Each of the delays DL1 to DL3 may delay a logic "high" signal during a predetermined time. In example embodiments, it is assumed that delay times TD1, TD2, and TD3 of the first to third delays DL1 to DL3 have a relationship such as TD1<TD2<TD3. When an input signal transitions from a high level to a low level, each delay may output a logic "low" signal with reduced delay.

Logic "high" signals sequentially output from the first to third voltage detectors VD1 to VD3 may be delayed by the first to third delays DL1 to DL3, respectively. A point of time when each delay outputs a signal may be based on a point of time when the main power source voltage $V_{EXT}$ is detected by a corresponding voltage detector and a delay time of each delay.

The voltage regulator circuit 320 may include a first voltage regulator VR1, a second voltage regulator VR2, and a third voltage regulator VR3. However, the number of voltage regulators is not limited thereto. For example, some embodiments of the inventive subject matter may be applied to a power supply circuit having two or more voltage detectors and two or more delays.

Each of the voltage regulators VR1 to VR3 may have power and enable signal inputs $V_{IN}$ and EN. Each of the voltage regulators VR1 to VR3 may convert the main power source voltage $V_{EXT}$ into a predetermined voltage level in response to the enable signal EN.

The main power source voltage $V_{EXT}$ may be applied to the power input $V_{IN}$ of each of the voltage regulators VR1 to VR3. The enable signal input EN of each of the voltage regulators VR1 to VR3 may be connected to a corresponding output of the delay circuit 312. Whether each of the voltage regulators VR1 to VR3 outputs a voltage may be decided according to whether the main power source voltage $V_{EXT}$ is applied and according to an output voltage level of each delay connected to each voltage regulator.

The discharge circuit 330 may include a discharge control circuit 330a, an input discharge circuit 330b, and an output discharge circuit 330c. The discharge circuit 330 may discharge charge remaining at input and output stages of the voltage regulator circuit 320 in response to a control signal from the sequence control circuit 310.

The discharge control circuit 330a may control the input and output discharge circuit 330b and 330c in response to the control signal from the sequence control circuit 310. The discharge control circuit 330a may include a first inverter IN1, a second inverter IN2, and a third inverter IN3 which are connected as illustrated in FIG. 3.

The input discharge circuit 330b may be connected to an input of the voltage regulator circuit 320. The input discharge circuit 330b may discharge remaining charge by providing a current path between an input of the voltage regulator circuit 320 and a ground. The input discharge circuit 330b may include a first input resistor $R_{F1}$, a second input resistor $R_{F2}$, a third input resistor $R_{F3}$, a first input switch $M_{F1}$, a second input switch $M_{F2}$, and a third input switch $M_{F3}$ which are connected as illustrated in FIG. 3.

The output discharge circuit 330c may be connected to an output of the voltage regulator circuit 320. The output discharge circuit 330c may discharge remaining charge by providing a current path between an output of the voltage regulator circuit 320 and a ground. The output discharge circuit 330c may include a first output resistor $R_{B1}$, a second output resistor $R_{B2}$, a third output resistor $R_{B3}$, a first output switch $M_{B1}$, a second output switch $M_{B2}$, and a third output switch $M_{B3}$ which are connected as illustrated in FIG. 3. A discharge operation executed by the discharge circuit 330 of the power supply circuit 300 is described below.

The backup power source 340 may store power provided from the main power source. The backup power source 340 may include a backup diode $D_{BK}$ and a backup capacitor $C_{BK}$ which are connected as illustrated in FIG. 3. The backup power source 340 may supply power stored in the backup capacitor $D_{BK}$ via the backup diode $D_{BK}$ to provide an operating voltage for the discharge control circuit 330a. Thus, if the main power source is interrupted, the discharge control circuit 330a may operate until power stored in the backup power source 340 is consumed.

Figure 4:
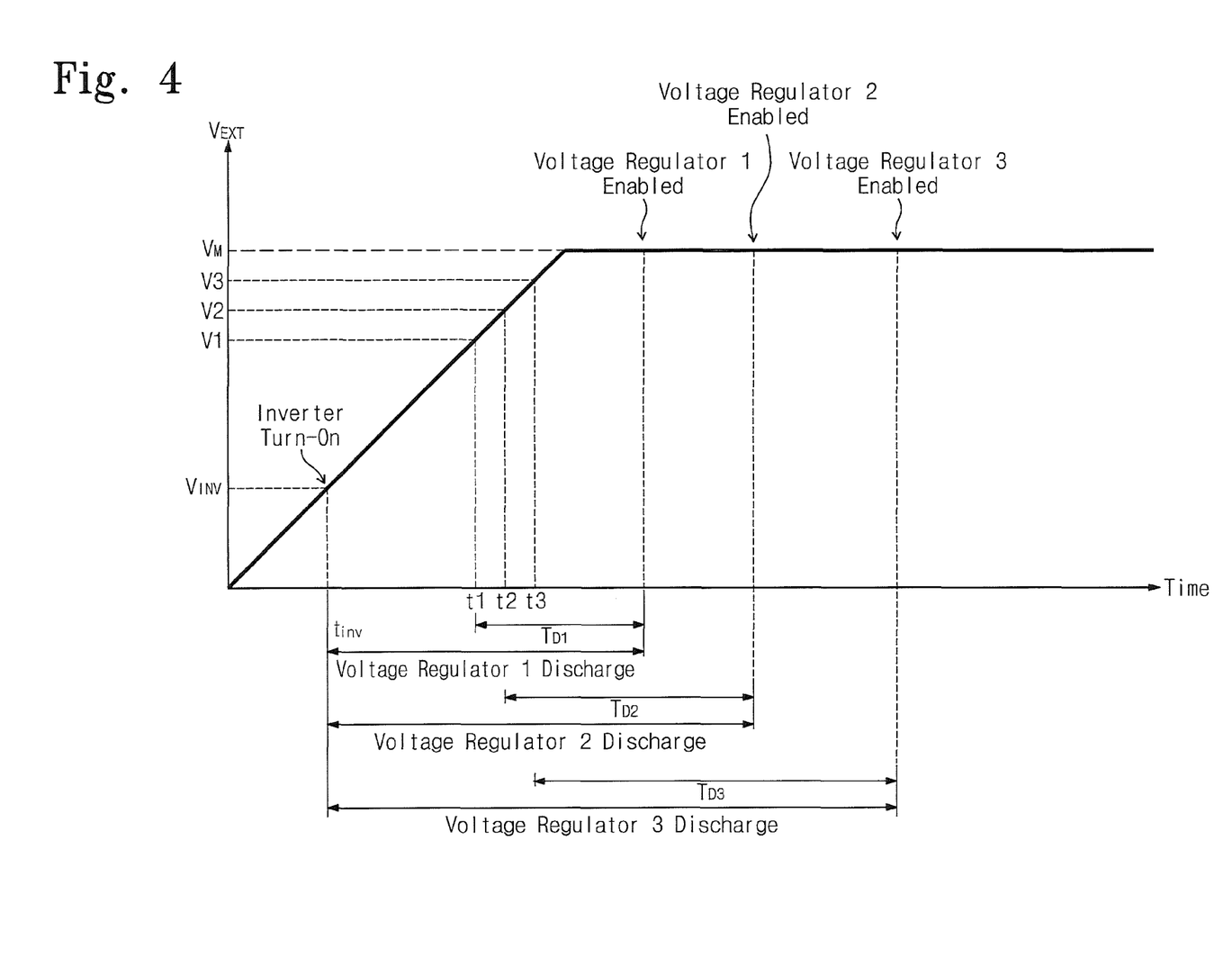
FIG. 4 is a graph illustrating a charge discharging operation of a power supply circuit in FIG. 3.

A discharge operation of the power supply circuit 300 will now be described with reference to FIGS. 3 and 4, where FIG. 4 is a graph illustrating a charge discharging operation of a power supply circuit in FIG. 3. Referring to FIG. 4, a main power source voltage $V_{EXT}$ applied to a power supply circuit may first reach an inverter operating voltage $V_{INV}$. The inverter operating voltage $V_{INV}$ may be an operating voltage of inverters of the discharge control circuit 330a.

Since a main power source voltage VEXT does not reach a voltage detection level of a sequence control circuit 310 at a time $t_{inv}$ when the main power source voltage reaches the inverter operating voltage $V_{INV}$, an output of the sequence control circuit 310 may be at a "low" state. Thus, a discharge control circuit 330a may output a "high" state signal.

Returning to FIG. 3, an output stage of the discharge control circuit 330a may be connected to gates of switches $M_{F1}$ to $M_{F3}$ and $M_{B1}$ to $M_{B3}$ of input and output discharge circuits 330b and 330c. When a high state signal is applied to the gates of the switches from the discharge control circuit 330a, the switches $M_{F1}$ to $M_{F3}$ and $M_{B1}$ to $M_{B3}$ may be turned on. Charge remaining at an input stage of a voltage regulator circuit 320 may be discharged by the input discharge circuit 330b, and charge remaining at an output stage of the voltage regulator circuit 320 may be discharged by the output discharge circuit 330c.

A discharge speed of the input and output discharge circuits 330b and 330c may be based on the amount of current flowing via switches $M_{F1}$ to $M_{F3}$ and $M_{B1}$ to $M_{B3}$ of the input and output discharge circuits 330b and 330c. The amount of current flowing via the switches $M_{F1}$ to $M_{F3}$ and $M_{B1}$ to $M_{B3}$ may be decided according to characteristics of the switches and resistances of resistors $R_{F1}$ to $R_{F3}$ and $R_{B1}$ to $R_{B3}$ connected to the switches $M_{F1}$ to $M_{F3}$ and $M_{B1}$ to $M_{B3}$. In the event that the same switches are used, a discharge speed of each circuit may be controlled by adjusting resistances of the input and output resistors $R_{F1}$ to $R_{F3}$ and $R_{B1}$ to $R_{B3}$.

Referring to FIG. 4, the main power source voltage $V_{EXT}$ may reach a voltage detection level V1 of a first voltage detector VD1. The first voltage detector VD1 may output a logic "high" signal at a time t1 when the main power source voltage $V_{EXT}$ reaches the voltage detection level V1.

A first delay DL1 may delay a logic "high" signal from the first voltage detector VD1. The first delay DL1 may output a logic "high" signal after a delay time $T_{D1}$ elapses from the time t1 when the main power source voltage $V_{EXT}$ reaches the voltage detection level V1.

The logic "high" signal from the first delay DL1 may be applied to an enable signal input EN of a first voltage regulator VR1. The first voltage regulator VR1 may be enabled by the logic "high" signal of the first delay DL1. Thus, the first voltage regulator VR1 may convert the main power source voltage $V_{EXT}$ into a low supply voltage to output it to a chipset.

A first inverter IN1 may output a logic "low" signal from a time when the first delay DL1 outputs a logic "high" signal. A first input switch MF1 and a first output switch MB1 may be turned off by a logic "low" output of the first inverter IN1, so that a discharge operation on the first voltage regulator VR1 is ended.

When a delay time $T_{D2}$ elapses from a time t2 when the main power source voltage $V_{EXT}$ reaches a voltage detection level V2 of a second voltage detector VD2, a second voltage regulator VR2 is enabled. Thus, a discharge operation on the second voltage regulator VR2 may be ended. When a delay time $T_{D3}$ elapses from a time t3 when the main power source voltage $V_{EXT}$ reaches a voltage detection level V3 of a third voltage detector VD3, a third voltage regulator VR3 is enabled. Thus, a discharge operation on the third voltage regulator VR3 may be ended.

If the main power source voltage $V_{EXT}$ continues to be supplied after a maximum voltage $V_M$, the voltage regulators VR1 to VR3 may continue to supply the converted voltages of the main power source voltage $V_{EXT}$ to the chipset.

Thus, a discharge circuit 330 of the power supply circuit 300 may discharge charge remaining at input and output stages of the voltage regulator circuit 320 from a time when the inverters IN1 to IN3 of the discharge control circuit 330a output logic "high" signals in response to an operating voltage until a time when a control signal is output from the sequence control circuit 310.

Figure 5:
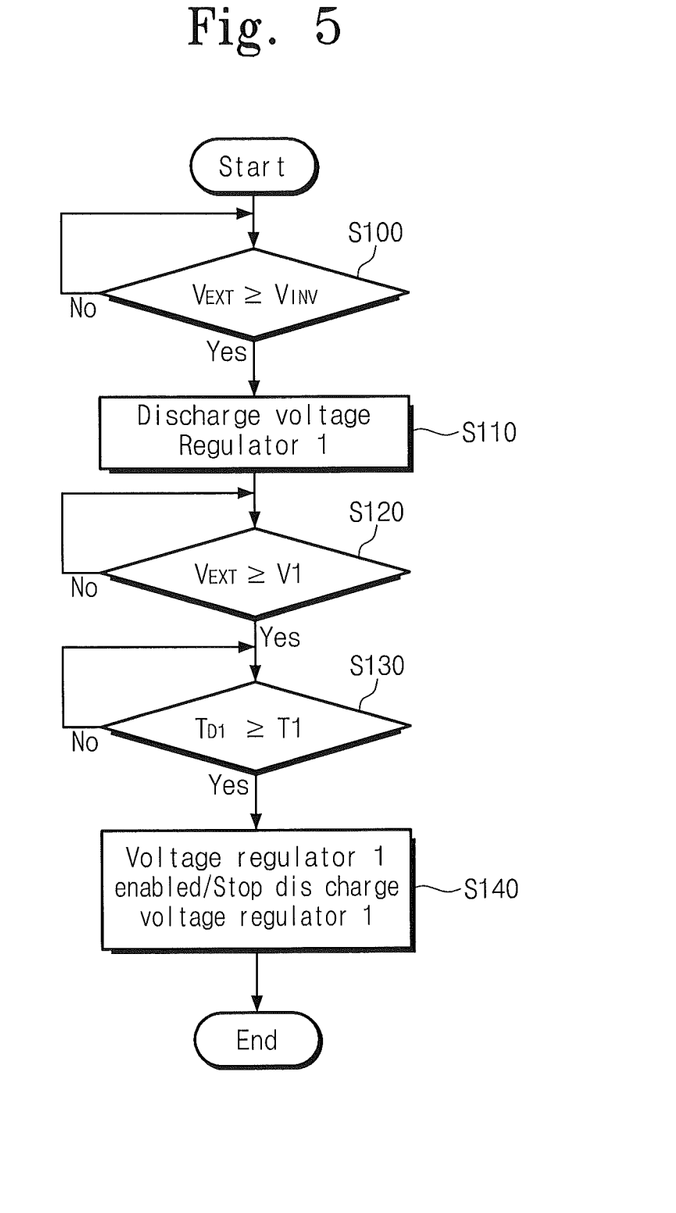
FIG. 5 is a flowchart illustrating a discharge operation of a power supply circuit.

FIG. 5 is a flowchart illustrating a discharge operation of a power supply circuit according to some embodiments. First to third voltage detectors may perform a discharge operation. Thus, only the first voltage detector will be described to avoid duplication of description. Referring to FIG. 5, in operation S100, whether a main power source voltage $V_{EXT}$ reaches an operating level $V_{INV}$ of a discharge control circuit 330a may be judged. If the main power source voltage $V_{EXT}$ has reached the operating level $V_{INV}$, operations proceed to operation S110, in which remaining charge of voltage regulators VR1, VR2, and VR3 is discharged according to activation of a discharge circuit 330.

In operation S120, whether the main power source voltage $V_{EXT}$ reaches a detection level V1 of the first voltage detector VD1 may be judged. If the main power source voltage $V_{EXT}$ has reached the detection level V1, operations proceed to operation S130, in which remaining charge of the voltage regulator VR1 continues to be discharged during a delay time $T_{D1}$ of a first delay DL1 connected to the first voltage detector VR1.

In FIG. 5, "T1" may indicate a time elapsing from a time when the main power source voltage VEXT reaches the detection level V1 of the first voltage detector VD1. When the lapse time T1 reaches the delay time TD1 of the first delay DL1, in operation S140, a discharge operation on the first voltage regulator VR1 may be ended, and the first voltage regulator VR1 may be enabled.

Like the first voltage detector VD1, each of the second and third voltage detectors VD2 and VD3 may discharge remaining charge during a delay time $T_{D2}$, $T_{D3}$ of a corresponding delay DL2, DL3 connected to a corresponding voltage detector VD2, VD3 if the main power source voltage $V_{EXT}$ reaches a detection level V2, V3 of a corresponding voltage detector. When a lapse time reaches a delay time $T_{D2}$, $T_{D3}$ of each delay DL2, DL3, a discharge operation on a corresponding voltage regulator VR2, VR3 may be ended, and the corresponding voltage regulator VR2, VR3 may be enabled.

Thus, a power supply circuit may control an output time of a voltage regulator circuit via a voltage detector circuit detecting a voltage level of a main power source and a delay circuit controlling an output time of the voltage detector circuit. Further, the power supply circuit may discharge remaining charge, charged before the voltage regulator circuit is enabled, via a discharge circuit. It is possible to secure a sufficient remaining charge discharge time using a delay time of a delay circuit of the power supply circuit.

A power supply circuit according to some embodiments of the inventive subject matter may control an applying order of supply voltages provided to a chipset when a main power source is supplied. Further, a power supply circuit according to some embodiments of the inventive subject matter may control an interruption order of the supply voltages provided to the chipset when the main power source is interrupted.

Figure 6:
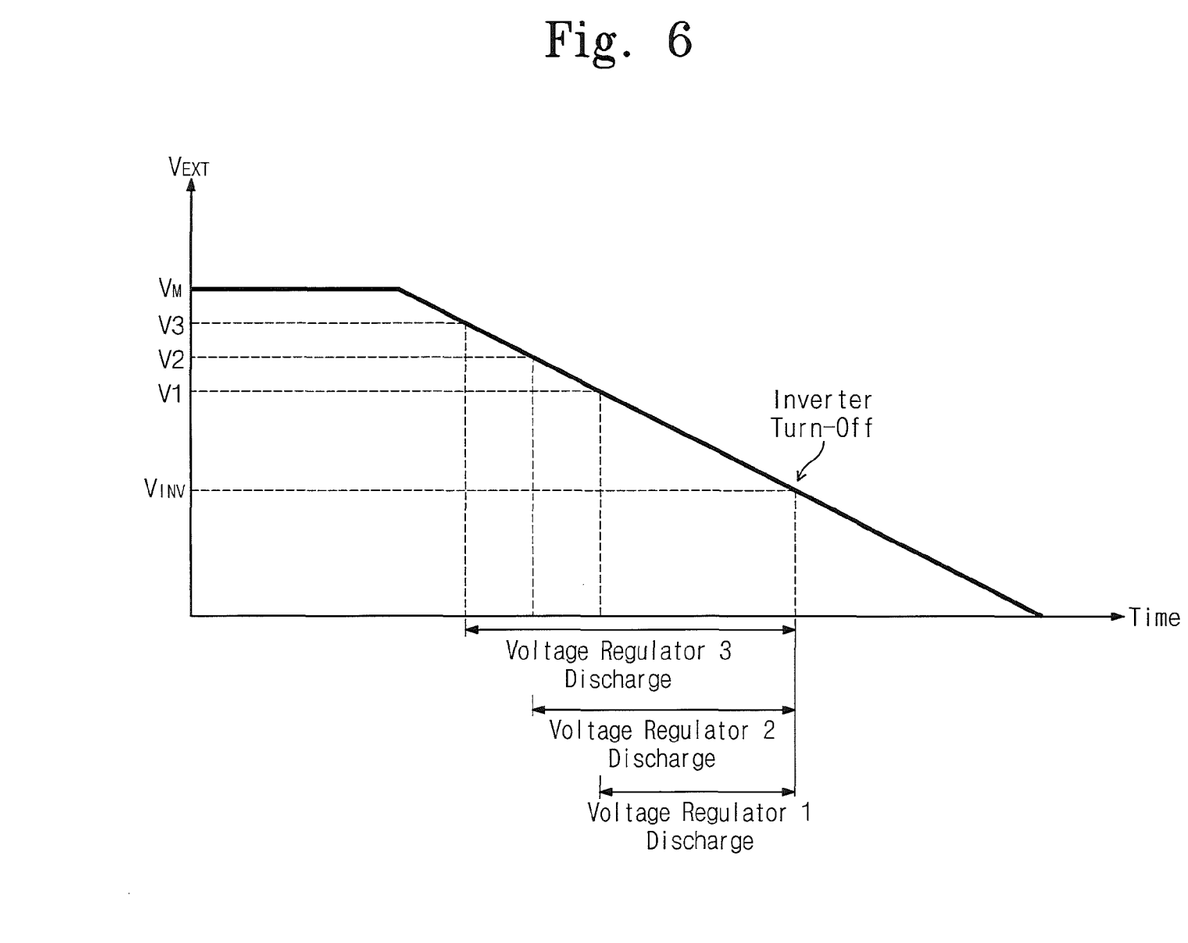
FIG. 6 is a graph describing an operation of a power supply circuit when a main power source is interrupted.

FIG. 6 is a graph describing an operation of a power supply circuit according to some embodiments when a main power source is interrupted. Referring to FIG. 6, a main power source voltage $V_{EXT}$ may start to gradually decrease from a maximum voltage $V_M$.

If the main power source voltage $V_{EXT}$ becomes lower than a detection level V3 of a third voltage detector VD3, the third voltage detector VD3 may output a logic "low" signal. A third delay DL3 may output a logic "low" signal from the third voltage detector VD3 with reduced delay, and a third inverter IN3 may output a logic "high" signal. Third input and output switches $M_{F3}$ and $M_{B3}$ may be turned on in response to a logic "high" signal from the third inverter IN3. Remaining charge of the third voltage regulator VR3 may be discharged via the turned-on third input and output switches $M_{F3}$ and $M_{B3}$. Discharge of a third voltage regulator VR3 may be performed until the main power source voltage $V_{EXT}$ becomes lower than the inverter operating voltage $V_{INV}$ and an inverter does not operate.

If the main power source voltage $V_{EXT}$ becomes lower than a detection level V2 of a second voltage detector VD2, the second voltage detector VD2 may output a logic "low" signal. A second delay DL2 may output a logic "low" signal from the second voltage detector VD2 with reduced delay, and a second inverter IN2 may output a logic "high" signal. Second input and output switches $M_{F2}$ and $M_{B2}$ may be turned on in response to a logic "high" signal from the second inverter IN2. Remaining charge of a second voltage regulator VR2 may be discharged via the turned-on second input and output switches $M_{F2}$ and $M_{B2}$. Discharge of the second voltage regulator VR2 may be performed until a voltage level of the main power source voltage $V_{EXT}$ becomes lower than the inverter operating voltage $V_{INV}$ and an inverter does not operate.

If the main power source voltage $V_{EXT}$ becomes lower than a detection level V1 of a first voltage detector VD1, the first voltage detector VD1 may output a logic "low" signal. A first delay DL1 may output a logic "low" signal from the first voltage detector VD1 with reduced delay, and a first inverter IN1 may output a logic "high" signal. First input and output switches $M_{F1}$ and $M_{B1}$ may be turned on in response to a logic "high" signal from the first inverter IN1. Remaining charge of a first voltage regulator VR1 may be discharged via the turned-on first input and output switches $M_{F1}$ and $M_{B1}$. A discharge operation on the first voltage regulator VR1 may be performed until a voltage level of the main power source voltage $V_{EXT}$ becomes lower than the inverter operating voltage $V_{INV}$ and an inverter does not operate.

The discharge operation of the power supply circuit may be ended when a voltage level of the main power source voltage $V_{EXT}$ becomes lower than the inverter operating voltage $V_{INV}$, and then may go to an off state.

As described above, a charge discharge speed of input and output discharge circuits 330b and 330c of a discharge circuit 330 may be based on the amount of current flowing via switches $M_{F1}$ to $M_{F3}$ and $M_{B1}$ to $M_{B3}$ of the input and output discharge circuits 330b and 330c. The amount of current flowing via the switches $M_{F1}$ to $M_{F3}$ and $M_{B1}$ to $M_{B3}$ may be decided according to characteristics of the switches and resistances of resistors $R_{F1}$ to $R_{F3}$ and $R_{B1}$ to $R_{B3}$ connected to the switches $M_{F1}$ to $M_{F3}$ and $M_{B1}$ to $M_{B3}$. In the event that the same switches are used, a discharge speed of each circuit may be controlled by adjusting resistances of the input and output resistors $R_{F1}$ to $R_{F3}$ and $R_{B1}$ to $R_{B3}$.

An interruption speed of supply voltages provided to a chipset may be based on a discharge speed on output stages of voltage regulators outputting the supply voltages. Thus, a power supply circuit according to some embodiments of the inventive subject matter may control an interruption order of the supply voltages provided to the chipset by controlling a discharge speed on remaining charge charged at an output stage of a voltage detector circuit.

Figure 7:
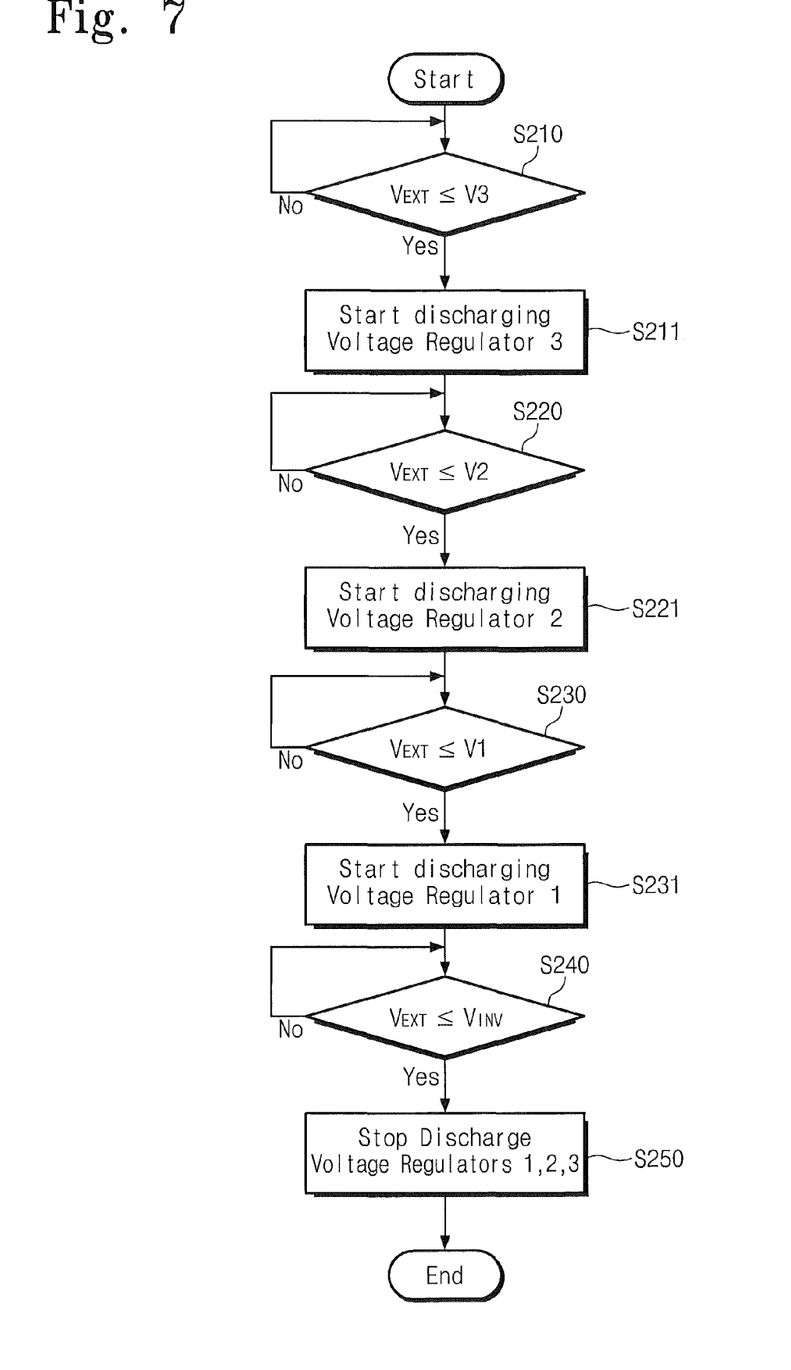
FIG. 7 is a flowchart describing an operation of a power supply circuit when a main power source is interrupted.

FIG. 7 is a flowchart illustrating operations of a power supply circuit according to some embodiments when a main power source is interrupted. Referring to FIG. 7, in operation S210, whether a main power source voltage $V_{EXT}$ becomes lower than a detection level V3 of a third voltage detector VD3 may be judged. If the main power source voltage $V_{EXT}$ becomes lower than the detection level V3 of the third voltage detector VD3, in operation S211, remaining charge of a third voltage regulator VR3 may be discharged via a discharge circuit 330.

In operation S220, whether the main power source voltage $V_{EXT}$ becomes lower than a detection level V2 of a second voltage detector VD2 may be judged. If whether the main power source voltage $V_{EXT}$ becomes lower than the detection level V2 of the second voltage detector VD2, in operation S221, remaining charge of a second voltage regulator VR2 may be discharged via the discharge circuit 330. In operation S230, whether the main power source voltage $V_{EXT}$ becomes lower than a detection level V1 of a first voltage detector VD1 may be judged. If the main power source voltage $V_{EXT}$ becomes lower than the detection level V1 of the first voltage detector VD1, in operation S231, remaining charge of a first voltage regulator VR1 may be discharged via the discharge circuit 330.

In operation S240, whether the main power source voltage $V_{EXT}$ becomes lower than an inverter operating voltage $V_{INV}$ may be judged. If the main power source voltage $V_{EXT}$ becomes lower than the inverter operating voltage $V_{INV}$, in operation S250, discharge operations of the voltage regulators VR1 to VR3 may be ended.

While the inventive subject matter has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. A power supply circuit for a chipset of a semiconductor device, comprising: a sequence control circuit configured to generate a control signal in response to a main power source;
   a voltage regulator circuit configured to convert a voltage of the main power source into a supply voltage and to output the supply voltage in response to the control signal;
   a discharge control circuit configured to generate a discharge signal indicating an operating state of the voltage regulator circuit in response to the control signal;
   an output discharge circuit configured to discharge an output stage of the voltage regulator circuit in response to the discharge signal;
   a backup power source configured to store power from the main power source and to supply the stored power to the discharge control circuit and the output discharge circuit when the main power source is interrupted; and
   an input discharge circuit configured to discharge an input stage of the voltage regulator circuit in response to the discharge signal when the voltage regulator circuit is in an inactive state.

2. The power supply circuit of claim 1, wherein the backup power source comprises:
   a diode configured to conduct a current from the main power source; and
   a capacitor configured to store charge transferred via the diode.

3. The power supply circuit of claim 1, wherein a discharge current of the output discharge circuit is variable.

4. The power supply circuit of claim 3, wherein the output discharge circuit comprises:
   a load connected to the output stage of the voltage regulator circuit; and a switch connected to the load and controlled in response to the discharge signal, wherein an amount of the discharge current is varied according to a magnitude of the load.

5. The power supply circuit of claim 1, wherein the discharge control circuit inverts the control signal to output an inverted control signal as the discharge signal.

6. The power supply circuit of claim 1, wherein the sequence control circuit comprises:
   a voltage detector circuit configured to output a signal when a voltage level of the main power source reaches a predetermined level; and
   a delay circuit configured to generate a delayed output signal from the signal output from the signal output from the voltage detector circuit;
   wherein the voltage detector circuit comprises:
   a first voltage detector configured to output a first signal when a voltage level of the main power source reaches a first detection level; and
   a second voltage detector configured to output a second signal when a voltage level of the main power source reaches a second detection level; wherein the delay circuit comprises:
   a first delay circuit connected to the first voltage detector and configured to generate a delayed first signal from the first signal produced by the first voltage detector: and a second delay circuit connected to the second voltage detector and configured to generate a delayed second signal from the second signal produced by the second voltage detector, the delayed first signal being output as a first control signal and the delayed second signal being output as a second control signal; and wherein the voltage regulator circuit is configured to output the supply voltage in response to the first and second control signals.

7. The power supply circuit of claim 6, wherein the first delay circuit outputs a low-level signal without delaying the first signal when the first signal is at a low level, and the second delay circuit outputs a low-level signal without delaying the second signal when the second signal is at a low level.

8. The power supply circuit of claim 7, wherein the voltage regulator circuit comprises:
a first voltage regulator circuit configured to convert the voltage of the main power source to a first supply voltage in response to the first control signal; and
a second voltage regulator circuit configured to convert the voltage of the main power source to a second supply voltage in response to the second control signal; and
wherein the output discharge circuit comprises:
a first discharge circuit configured to discharge the first voltage regulator circuit in response to the first control signal; and a second discharge circuit configured to discharge the second voltage regulator circuit in response to the second control signal.

9. A power supply circuit comprising:
a sequence control circuit configured to generate at least one control signal in response to a main power source;
a voltage regulator circuit configured to be coupled to the main power source and to selectively generate at least one regulated supply voltage therefrom in response to the at least one control signal wherein the voltage regulator circuit is configured to be enabled responsive to a first state of the at least one control signal and to be disabled responsive to a second state of the at least one control signal;
a discharge circuit configured to discharge the voltage regulator circuit responsive to the at least one control signal wherein the discharge circuit is configured to be enabled responsive to the first state of the at least one control signal and to be disabled responsive to die second state of the at least one control signal;
a backup power source configured to store energy received from the main power source and to provide the stored energy to the discharge circuit when the main power source is interrupted; and
an input discharge circuit configured to discharge at least one input of the voltage regulator circuit responsive to a discharge signal from the discharge circuit.

10. The power supply circuit of claim 9, wherein the discharge circuit comprises:

a discharge control circuit configured to generate the discharge signal responsive to the control signal; and
an output discharge circuit configured to discharge at least one output of the voltage regulator circuit responsive to the discharge signal.

11. The power supply circuit of claim 9, wherein the sequence control circuit comprises:
a voltage detector circuit configured to generate a voltage detection signal responsive to the main power source; and
a delay circuit configured to receive the voltage detection single signal and to responsively generate the control signal.

12. The power supply circuit of claim 11,
wherein the voltage detector circuit comprises a plurality of voltage detectors configured to generate respective voltage detection signals when a voltage of the main power supply reaches respective different levels; and
wherein the delay circuit comprises a plurality of delays, respective ones of which receive respective ones of the voltage detection signals and generate respective control signals responsive thereto.

13. The power supply circuit of claim 12, wherein the delays are configured to provide different delays.

14. The power supply circuit of claim 12, wherein the discharge circuit comprises a plurality of discharge circuits, respective ones of which are configured to discharge respective ones of the voltage regulators responsive to respective ones of the control signals.

15. A method of supplying power to a chipset, the method comprising:
charging a backup power source from a main power source;
detecting a voltage level of the main power source;
selectively enabling voltage regulators coupled between the main power source and power inputs of the chipset responsive to the detected voltage level of the main power source; and
selectively disabling and discharging the voltage regulators responsive to the detected voltage level of the main power supply voltage by discharging the voltage regulators using a discharge circuit powered by the backup power source when the main power source is interrupted,
wherein the voltage regulators are configured to output respective different voltages, wherein selectively enabling voltage regulators coupled between the main power source and power inputs of the chipset responsive to the detected voltage level of the main power source comprises sequentially enabling the voltage regulators as the detected voltage at the main power source increases and sequentially disabling and discharging the voltage regulators as the detected voltage level of the main power supply decreases.

* * * * *